Patented May 24, 1932

1,860,248

UNITED STATES PATENT OFFICE

JULIUS HYMAN AND ARTHUR F. SCHLANDT, OF CHICAGO, ILLINOIS, ASSIGNORS TO THE PURE OIL COMPANY, OF CHICAGO, ILLINOIS, A CORPORATION OF OHIO

PROCESS FOR TREATING PETROLEUM EMULSIONS

No Drawing.   Application filed August 17, 1929.   Serial No. 386,734.

This invention relates to an improved process for breaking petroleum emulsions for the purpose of separating in an economical and effective manner the oil content from the other undesirable portions of the emulsion. Petroleum emulsions of the character referred to are frequently found in the crude oils pumped from walls, and in the bottoms of oil storage tanks or other receptacles in which such crude oil is allowed to stand. On analysis these emulsions are found to contain varying amounts of oil, water or brine and other foreign matter and are of a relatively stable character, being difficult to break down and separate into their component parts in an economical and practical manner. The emulsions are known in the industry by a variety of names and are frequently referred to as cut oil, roily oil, basic sediment, bottom settlings, sludge and B. S.

It is a principal object of the present invention to treat petroleum emulsions of this type in an effective manner to destroy the permanency or stability of the emulsion and cause it to break or separate promptly in order to yield separate strata of oil and water and other foreign substances, whereby the oil may be separately collected, removed and placed to various commercial uses.

Another object of the invention resides in breaking petroleum emulsions of the character referred to above through the employment of a demulsifying treating agent consisting of the sulfides, polysulfides and hydrosulfides of sodium, potassium, ammonium or substituted ammonia.

For example, an oil-field emulsion containing about 50% basic sediment and water (B. S. and W.) was treated with a comparatively small amount of "spent caustic", an oil refinery waste containing sulfides of sodium. After a short heat treatment at a temperature of approximately 135° F., the emulsion broke quite completely. Chemically pure sodium sulfide has also been found to be quite as effective as the "spent caustic". However, for commercial reasons the "spent caustic" is preferably employed since at present it is largely a waste product and its use in the treating of petroleum emulsions provides for the large economical employment thereof.

As another example, an unusually stable oil-field emulsion containing about 16% B. S. and W. was treated with a comparatively small amount of aqueous ammonium sulfide. A subsequent twenty-four hour heating of the mixture to 135° F. was found to be sufficient to break the emulsion in a very satisfactory manner.

While there is some question as to whether all emulsions of the character referred to can be broken economically by the use of soluble sulfides alone, we find that, in general, those emulsions whose ashes show a considerable iron oxide content are most profitably treated by alkali sulfides and especially ammonium sulfide.

While we prefer to use wherever possible "spent caustic" other compounds of analogous character may also be utilized effectively and economically. "Spent caustic" is obtained from oil refining processes wherein oil is treated with sulfuric acid and then neutralized with alkali. Use of this waste material in breaking emulsions of the nature referred to is thus quite profitable since use is made of a hitherto waste product. As stated, however, the present invention comprehends also the employment of chemically pure sodium sulfide, the employment of ammonium sulfide, potassium sulfide and, in fact, the use as treating agents for breaking petroleum emulsions of the sulfides, polysulfides and hydrosulfides of sodium, potassium, ammonium or substituted ammonia. These materials may be added to the emulsions either singly or in combination in quantities determined largely by experience and use and the resulting mixtures are then heated at a temperature of the order of 135° F. for periods of time necessary to secure the desired breaking down of petroleum emulsions under treatment into their component parts, namely, oil, water and basic sediment.

What is claimed is:

In the treatment of oil-field emulsion to recover the oil content thereof, the steps which comprise adding to such an emulsion a treating agent in the form of ammonium sulfide, and heating the resulting mixture for a period of time sufficient to break the emulsion into its component parts.

In testimony whereof we affix our signatures.

JULIUS HYMAN.
ARTHUR F. SCHLANDT.